US007010555B2

(12) United States Patent
Blandy et al.

(10) Patent No.: US 7,010,555 B2
(45) Date of Patent: Mar. 7, 2006

(54) SYSTEM AND METHOD FOR COMPACTING A COMPUTER SYSTEM HEAP

(75) Inventors: Geoffrey Owen Blandy, Austin, TX (US); Robert Tod Dimpsey, Austin, TX (US); Kean G. Kuiper, Round Rock, TX (US); Matthew Francis Peters, Hants (GB)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 10/273,642

(22) Filed: Oct. 17, 2002

(65) Prior Publication Data

US 2004/0078381 A1    Apr. 22, 2004

(51) Int. Cl.
    *G06F 17/30* (2006.01)
(52) U.S. Cl. ............... 707/206; 707/205; 707/101; 707/102; 707/104.1; 711/159; 711/161; 711/170
(58) Field of Classification Search ............... 707/206, 707/101, 102, 104.1, 205; 711/159, 166, 711/161, 170, 173
    See application file for complete search history.

(56) References Cited

U.S. PATENT DOCUMENTS

| 4,907,151 | A | * | 3/1990 | Bartlett ..................... 711/166 |
| 4,989,134 | A | * | 1/1991 | Shaw ......................... 707/206 |
| 5,561,786 | A | * | 10/1996 | Morse ........................ 711/170 |
| 6,125,434 | A | * | 9/2000 | Willard et al. ............. 711/170 |
| 6,763,440 | B1 | * | 7/2004 | Traversat et al. ........... 711/159 |
| 6,865,657 | B1 | * | 3/2005 | Traversat et al. ........... 711/170 |
| 6,868,488 | B1 | * | 3/2005 | Garthwaite ................. 711/173 |
| 2004/0003014 | A1 | * | 1/2004 | Nagarajan et al. .......... 707/206 |
| 2004/0039759 | A1 | * | 2/2004 | Detlefs et al. .............. 707/206 |

OTHER PUBLICATIONS

"Optimizeit Suite Complete Performance Solution for Java," Borland Marketing Pamphlet. (2 pgs).
Jones et al., *Garbage Collection*, (pp. 106-107).
Dimpsey et al., "Java Server Performance: A Case Study of Building Efficient, Scalable Jvms," *IBM Systems Journal* vol. 39, No. 1, 2000. (pp. 151-174).
Haddon et al., "A Compaction Procedure for Variable-Length Storage Elements," (pp. 162-164).

* cited by examiner

*Primary Examiner*—Thuy N. Pardo
(74) *Attorney, Agent, or Firm*—VanLeeuwen & VanLeeuwen; Marilyn S. Dawkins (57) ABSTRACT

A system and method for incrementally compacting a computer system heap is presented. A heap, such as a garbage-collected heap in a Java environment, is divided into logical regions. When the heap is becoming fragmented, an incremental compaction cycle is commenced. During a first time period, the first region of the heap is compacted, with subsequent regions being compacted during subsequent time periods. A time period commences when a garbage collection event occurs. In a multiprocessor environment the regions can be divided into a number of sections which are each compacted using a different processor. One or more break tables are constructed indicating how far contiguous groups of moveable objects should be moved to better group objects and eliminate interspersed free spaces. References throughout the heap that point to objects within the compacted region are then adjusted so that the references point to the new object locations.

27 Claims, 10 Drawing Sheets

SYSTEM AND METHOD FOR COMPACTING A COMPUTER SYSTEM HEAP

BACKGROUND OF THE INVENTION

1. Technical Field

The present invention relates in general to a system and method for compacting computer system heaps. More particularly, the present invention relates to a system and method for improving heap compaction during a garbage collection cycle in an environment such as that used in a Java virtual machine.

2. Description of the Related Art

Middleware environments, such as that provided by a Java virtual machine (JVM), often use a heap to store objects created in the environment. The Java virtual machine's heap stores all objects created by a running Java application. Objects are created by various instructions (e.g., the new, newarray, anewarray, multianewarray instructions), but are never freed (i.e., released) explicitly by the code. Garbage collection is the process of automatically freeing objects that are no longer referenced by the program.

The Java virtual machine specification does not require any particular garbage collection technique. The name "garbage collection" implies that objects no longer needed by the program are "garbage" and can be thrown away. A more accurate and up-to-date metaphor might be "memory recycling." When an object is no longer referenced by the program, the heap space it occupies can be recycled so that the space is made available for subsequent new objects. The garbage collector must somehow determine which objects are no longer referenced by the program and make available the heap space occupied by such unreferenced objects.

In addition to freeing unreferenced objects, a garbage collector may also combat heap fragmentation. Heap fragmentation occurs through the course of normal program execution. New objects are allocated, and unreferenced objects are freed such that free portions of heap memory are left in between portions occupied by live objects. Requests to allocate new objects may have to be filled by extending the size of the heap even though there is enough total unused space in the existing heap. This will occur if there is not enough contiguous free heap space available into which the new object will fit. On a virtual memory system, the extra paging (or swapping) required to service an ever growing heap can degrade the performance of the executing program. On an embedded system with low memory, fragmentation could cause the virtual machine to "run out of memory" unnecessarily. In addition, most virtual machines have a limit on the size of the heap. In these systems, fragmentation may cause an application to stop running even though there is enough total free space in the heap.

Garbage collection performs the burden of freeing allocated memory. Determining when to explicitly free allocated memory can be difficult. Delegating this task to the Java virtual machine has several advantages. First, it can increase programmer productivity. When programming in non-garbage-collected languages a programmer can spend extensive amounts of time detecting and fixing an elusive memory problem.

A second advantage of garbage collection is that it helps ensure program integrity. Garbage collection is an important part of Java's security strategy. Java programmers are unable to accidentally (or purposely) crash the Java virtual machine by incorrectly freeing memory.

A challenge of a garbage-collected heap is that it adds an overhead that can affect program performance. The Java virtual machine has to keep track of which objects are being referenced by the executing program, and finalize and free unreferenced objects on the fly. This activity likely requires more CPU time than would be needed if the program explicitly freed unnecessary memory. In addition, programmers in a garbage-collected environment have less control over the scheduling of CPU time devoted to freeing objects that are no longer needed.

An additional challenge of a garbage-collected heap is that it periodically needs to be compacted in order to combat heap fragmentation. During compaction, objects are moved in order to defragment the heap space. Defragmenting the heap space results in objects being moved to a contiguous memory region with little or no memory between the moved objects. The movement of objects results in larger contiguous blocks of free space that can be used to store additional (i.e., new) objects. During compaction of a traditional garbage-collected heap, the entire heap is traversed and many objects are moved within the heap. Heap sizes can be quite large and can store hundreds or thousands of objects. Consequently, moving such a large amount of objects takes considerable computing resources. The use of the resources to perform compaction often causes a noticeable pauses to the user, as well as software applications, using the computer.

What is needed, therefore, is a system and method that incrementally compacts the heap so that a portion, or region, of the heap is compacted rather than compacting the entire heap. In addition, what is needed is a system and method that utilizes multiple processors to divide the region being compacted into multiple sections with each section being compacted by a separate processing thread. Furthermore, what is needed is a system and method that is able to work in an environment where some objects in the heap cannot be moved.

SUMMARY

It has been discovered that the aforementioned challenges are resolved using a system and method that incrementally compacts a computer system heap. A computer system heap, or heap, is divided into a number of regions that are compacted at different times from one another rather than compacting the entire heap at one time, as is the traditional method. The compacting is performed without "evacuating" objects from the region. In other words, objects in the region being compacted are not removed from the region during the compaction process.

Triggers, such as an analysis of the amount of heap fragmentation, are used to initiate an incremental compaction sequence. During the incremental compaction sequence, a first region of the heap is compacted commencing at a first time period. The other regions of the heap are then compacted at other times so that, ultimately, each region within the heap is compacted. The system can keep track of which regions have been compacted, which regions have not yet been compacted, and which region is next,to be compacted. In this manner, the compaction of any particular region will not impact overall system performance as much as the impact that occurs when the entire heap is compacted. Thus, after the completion of an incremental compaction sequence, the entire heap has been compacted one region at a time without any of the individual compactions overly impacting system performance.

An event, such as a garbage collection event or a timer, is used to trigger the compaction of the next region to be compacted. Using a garbage collection event as a trigger, when a garbage collection event occurs the system determines whether it is in an incremental compaction sequence, or cycle. If the system is in a compaction cycle, the system determines which region of the heap is next to be compacted and the selected region is compacted.

A garbage collection event occurs when an object request requires more space than will fit in the existing free spaces within the heap. When this occurs, the system marks non-extinct, or "live," objects within the entire heap. If an incremental compaction cycle is currently underway, a fix up references set are created for the region being compacted. In other words, objects throughout the heap that refer to, or reference, objects or addresses within the region that is about to be compacted are recorded so that the references can be modified when the objects within the region being compacted are moved. This allows the references to continue pointing to the correct locations within the compacted region even though the objects in the region have been moved.

After "live" objects (or conversely, "dead" objects) have been identified, the entire heap is swept to remove, albeit logically, objects from the heap that are "dead" and no longer being used. In one embodiment, a complete compaction of the entire heap occurs when the sweep does not create enough space to satisfy the request that triggered the garbage collection event.

If an incremental compaction cycle is underway, a pointer to the next region in the heap to be compacted is retrieved and the identified region is compacted. Compaction includes determining how far each of the objects within the region should be moved, or "slid," in order to contiguously group objects and, correspondingly, create larger free spaces within the heap that can be used to satisfy future requests. The information regarding how far objects, or groups of objects, should be moved is stored in a "break table." During compaction, the objects are moved from their original place in the region to another place in the region resulting in moved objects occupying a contiguous region of heap space. In one embodiment, preferably where there are multiple system processors available, the identified region is further divided into a number of logical sections. After the system determines where each of the objects should be placed, a plurality of threads are created (one for each processor) so that the task of moving the objects to different places in the region is shared by two or more processors (each processor being responsible for moving the objects found in a different section), thus increasing the efficiency of compacting the region. When the region is finished being compacted, a pointer is set indicating the next region to be compacted. This continues until each region within the heap has been compacted, at which time the incremental compaction cycle is completed and the corresponding flag is turned off.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
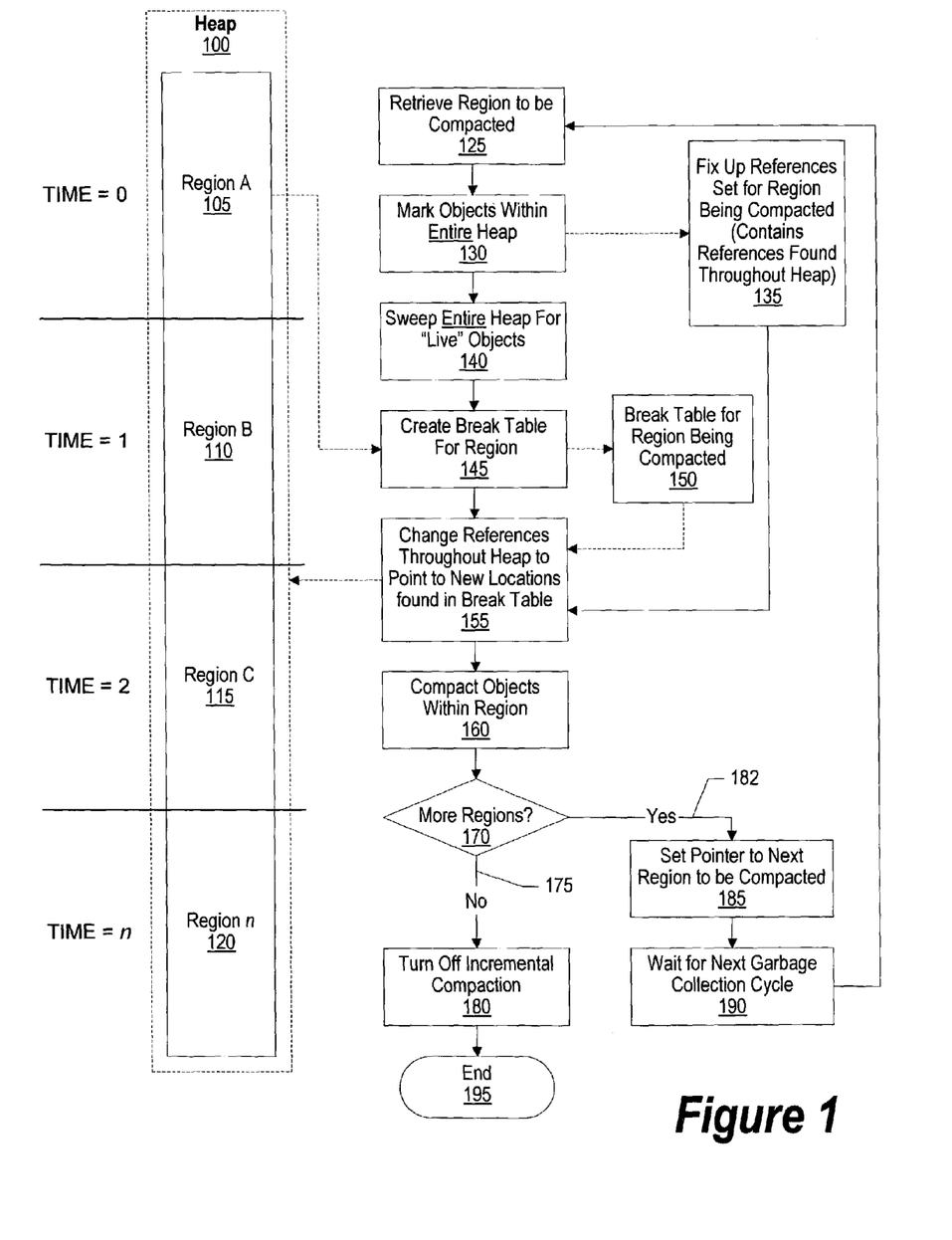
FIG. 1 is a high level flowchart and diagram showing a garbage-collected heap being incrementally compacted.

FIG. 1 is a high level flowchart and diagram showing a garbage-collected heap being incrementally compacted. Garbage collected heap 100 is shown divided into logical regions (Region A 105, Region B 110, Region C 115, and other Regions n 120). The heap can be divided into any number of regions with each region being compacted separately from the other regions. In the example shown, at Time=0, Region A (105) is compacted. During a subsequent garbage collection cycle (Time=1) Region B (110) is compacted. Likewise, during a subsequent garbage collection cycle (Time=2) the next region (Region C 115) is compacted. This process of incrementally compacting the various regions continues until all regions within garbage-collected heap 100 are compacted. The number of regions into which the garbage-collected heap is divided varies from one implementation to the next and may be based upon the heap size, number of objects in the heap, and average size of objects stored in the heap. For a very large heap, more regions may be used given that using more regions will reduce the size of the regions and, therefore, reduce the time needed to compact any particular region. Conversely, a smaller garbage-collected heap may be divided into fewer regions. In the example shown, the heap is compacted from the bottom of the heap (starting at the top of Region A 105) and ending at the top of the heap (ending at the bottom of Region n 120). As will be appreciated by those skilled in the art, the garbage-collected heap can also be compacted starting at the top of the heap incrementally compacting until the bottom of the heap is reached.

In step 125, the region of the garbage-collected heap that is being compacted is retrieved. In the example shown, the first region compacted in a incremental compaction cycle is Region A (105) located at the end of the heap. After the first region is compacted, a pointer is set to point to the next region (Region B (110)) that will be compacted during the next garbage collection cycle. The pointer to the next region continues to be updated until all regions have been incrementally compacted, at which point incremental compaction is turned off (in an alternative embodiment, the pointer is reset to point back to the first region to restart the incremental compaction cycle).

The entire garbage-collected heap is traversed (step 130) in order to mark which objects are "alive" (i.e., active, still being used, etc.) as compared with those objects that are "dead." In addition, during the marking phase, fix up references set table 135 is created with references throughout the heap that point to the region that is being compacted. For example, if an object in Region C (not being compacted) includes an address to an object within Region A (the region being compacted), then a record is written to the fix up references set. When the compaction routine determines the new location for the object being referenced in Region A, then the reference found in Region C will be updated to adjust the reference to point to the correct location.

The entire garbage-collected heap is then swept (step 140) in order to reclaim space that was occupied by "dead" objects. After the heap has been swept, the amount and location of the free spaces in the region being compacted is known. This information is used to create break table 150 for the region being compacted. Break table 150 indicates the starting address of an object with the region (or contiguous group of objects within the region) and the "slide amount" (i.e., the amount that the object or group of objects should be moved).

Now that the slide amounts for the objects has been determined, this information is used to change references throughout the garbage-collected heap to point to the new locations as indicated in the break table (step 155). The references are read from fix up references set 135 and the slide amount for the referenced object is retrieved from break table 150. The slide amount is applied to the reference so that the reference will point to the correct location after the object has been moved. More information regarding updating references can be found in FIG. 9 and the corresponding detailed description.

The objects within the region are compacted (i.e., moved) according to the slide amounts found in the break table (step 160). After the objects within the region are compacted, a determination is made as to whether there are more regions to compact during the incremental compaction cycle (decision 170). If the compacted region was the last region in the garbage-collected heap, then decision 170 branches to "no" branch 175 whereupon incremental compaction is turned off (step 180). In one embodiment, incremental compaction is turned off by setting a flag that is read during a garbage collection cycle. In another embodiment, incremental compaction is not turned off but, instead, starts over at the first region (i.e., Region A within the heap). In the alternative embodiment, a pointer is set pointing to the first region so that during a subsequent garbage collection event, the first region is compacted.

On the other hand, if there are additional regions to compact during the incremental compaction cycle, decision 170 branches to "yes" branch 182 whereupon a pointer is set to point to the next region to be compacted (step 185). In the example shown, once Region A is compacted the pointer would be set to point to the next region (Region B) to be compacted within garbage-collected heap 100. Incremental compaction processing then waits for a subsequent garbage collection cycle (step 190) whereupon processing loops back to mark and sweep the heap and to compact the next region. This looping continues until the incremental compaction cycle is complete (i.e., there are no more regions within the heap to compact), at which point decision 170 branches to "no" branch 175 whereupon incremental compaction is turned off (step 180) and processing ends at 195.

Figure 2:
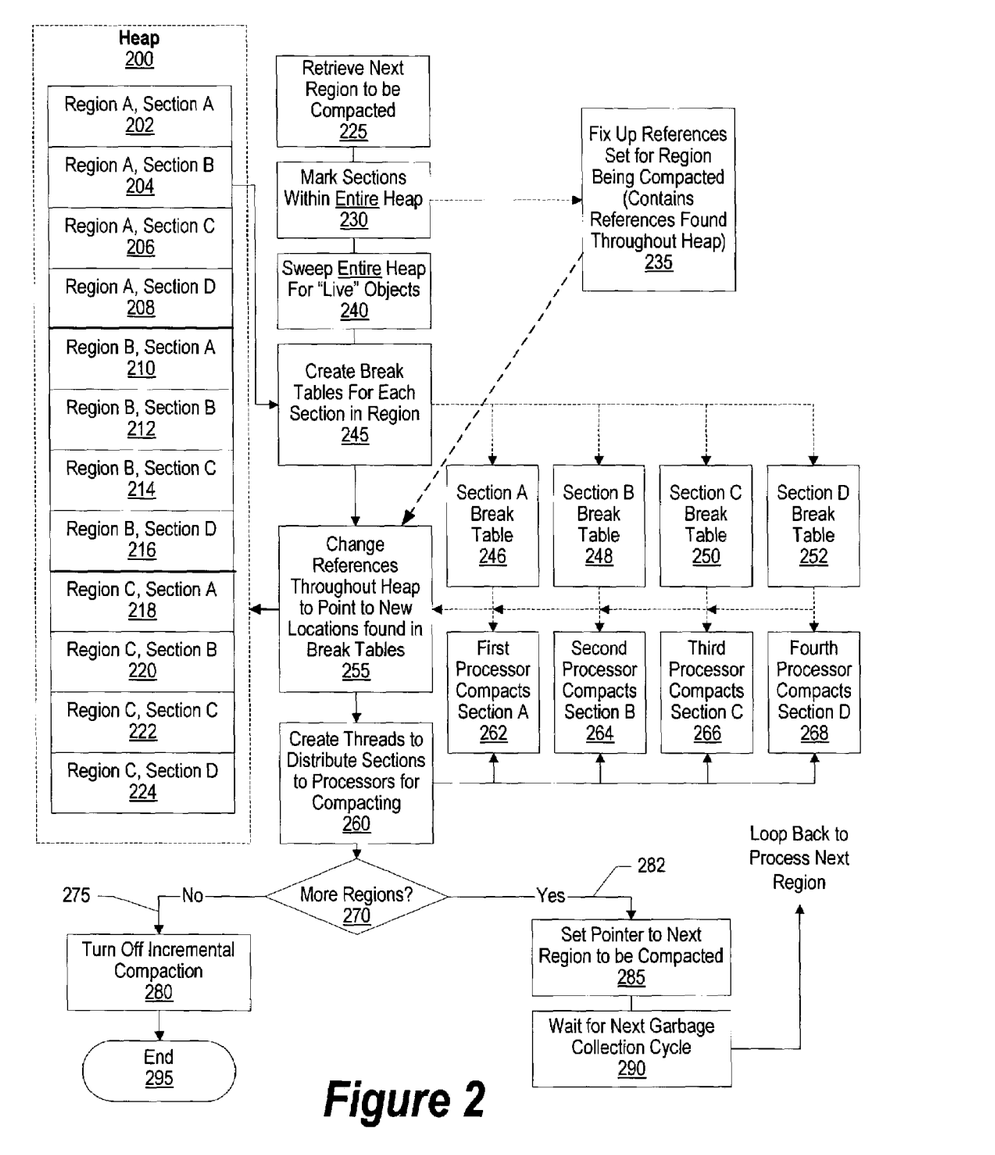
FIG. 2 is a high level flowchart and diagram showing a garbage-collected heap being incrementally compacted using a Symmetrical Multiprocessing Processor (SMP)

FIG. 2 is a high level flowchart and diagram showing a garbage-collected heap being incrementally compacted using a Symmetrical Multiprocessing Processor (SMP). FIG. 2 is similar to FIG. 1 in that each describes an incremental compaction scheme. The process described in FIG. 2, however, adds the ability to speed the compaction of the region by dividing the region into sections that are each compacted in separate threads of execution, preferably by different processors in a multiprocessor environment. Garbage-collected heap 200 is shown with three regions, Regions A, B, and C, and each of the regions is further divided into four sections. Region A includes Section A 202, Section B 204, Section C 206, and Section D 208. Likewise, Region B includes Section A 210, Section B 212, Section C 214, and Section D 216. Finally, Region C includes Section A 218, Section B 220, Section C 222, and Section D 224. Processing commences with the retrieval of the next region to be compacted during the incremental compaction cycle. The details of steps 225, 230, and 240 are substantially similar to steps 125, 130, and 140 (each found in FIG. 1), respectively. In addition, fix up references set 235 is substantially similar to fix up references set 135 shown in FIG. 1. For descriptions of these substantially similar steps refer to the detailed description corresponding to FIG. 1, above.

Continuing with the processing shown in FIG. 2, after the garbage-collected heap has been marked and swept, a break table is created for each section within the region being compacted (step 245). The number of sections is preferably equal to or less than the number of processors in a multiprocessing computing environment. The break tables indicate the amount objects (or contiguous groups of objects) within a section will be moved (i.e., a slide amount). The creation of break tables results in one break table for each section of the region. In the example shown, the break tables that are created include a break table for Section A (246), Section B (248), Section C (250), and Section D (252).

Throughout the heap, references to the region being compacted are updated according to the slide amounts written to the various break tables (step 255). For example, if an object in Region C has a reference pointing to the region being compacted (i.e., Region A), the various break tables (246 through 252) are used to determine the new address for the reference. In one embodiment, the sections are of known sizes, or increments, so that the break table that includes the reference can be immediately ascertained without having to search multiple break tables.

After the references in the garbage-collected heap are updated, threads are created to distribute the compacting of the various sections to the various processors (step 260). In the example shown, four threads are created—one for each of the sections into which the region was divided. The various threads execute concurrently to compact the various sections. In the example shown, the first processor compacts Section A (step 262) using the slide amounts found in Section A's break table (break table 246). At the same time, the second, third, and fourth processors are executing threads (threads 264, 266, and 268, respectively) to compact Sections B, C, and D using the break tables corresponding to the sections (break tables 248, 250, and 252, respectively).

The remaining processing steps (decision 270, steps 280, 285, and 290, and end 295) are substantially similar to the corresponding steps shown in FIG. 1, decision 170, steps 180, 185, 190, and end 195, respectively. For details regarding these steps refer to the detailed description provided for FIG. 1, above.

Figure 3:
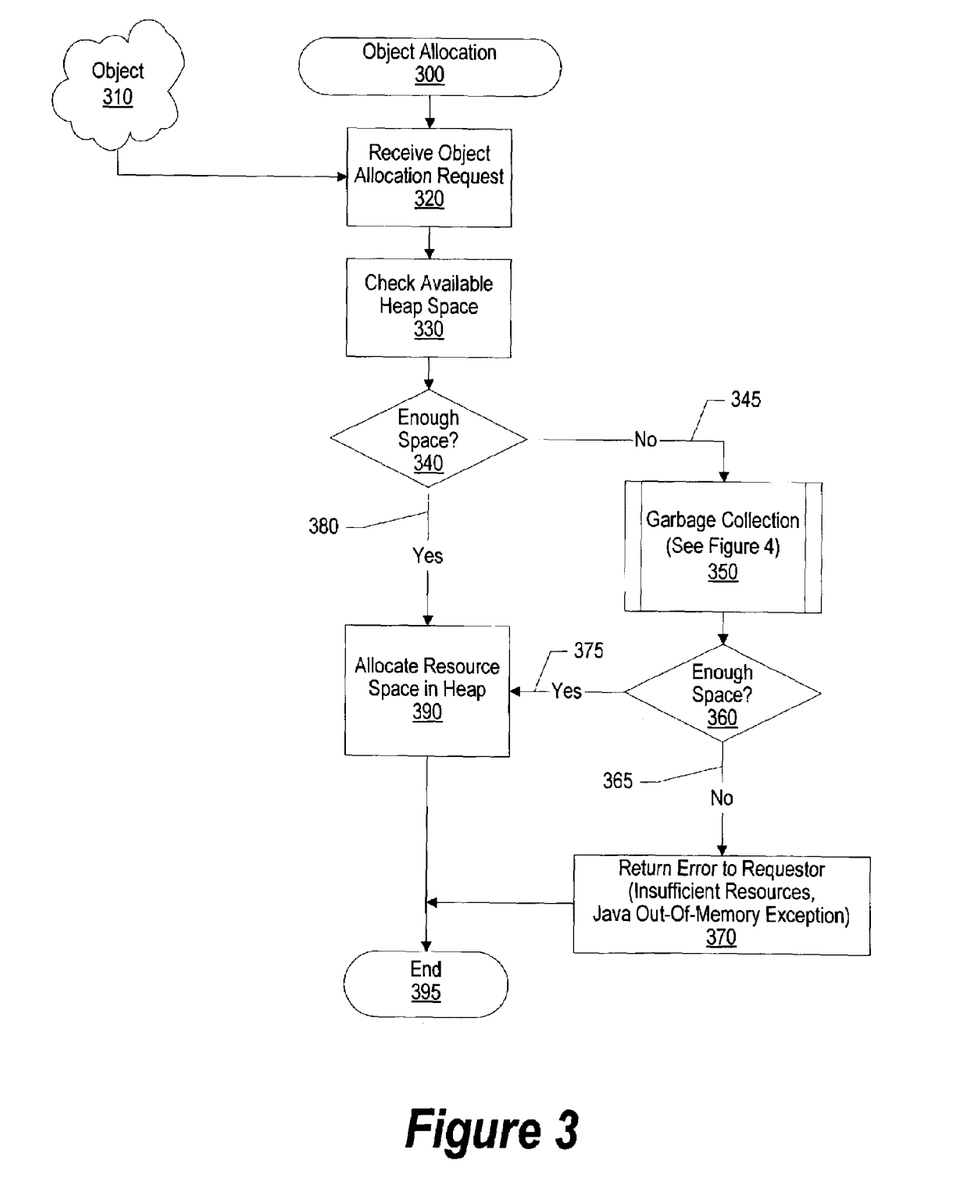
FIG. 3 is a high level flowchart showing invocation of a garbage collection process.

FIG. 3 is a high level flowchart showing invocation of a garbage collection process. Processing commences at 300 whereupon the object allocation process receives an object allocation request (step 320) from object 310 (e.g., a Java object).

The garbage-collected heap is checked to determine how much contiguous free space exists in the heap to satisfy the request (step 330). A determination is made as to whether there is enough contiguous heap space to satisfy the request (decision 340). If there is not enough contiguous heap space to satisfy the request, decision 340 branches to "no" branch 345 whereupon the garbage collection process is performed (predefined process 350, see FIG. 4 for further processing details).

A determination is made after garbage collection has been performed as to whether there is now enough contiguous heap space to satisfy the request (decision 360). If there is not enough contiguous heap space decision 360 branches to "no" branch 365 whereupon an error is returned to the requesting object (step 370) indicating that there are insufficient resources to satisfy the request. In Java, an out-of-memory exception would occur and the corresponding error code would be returned to the requesting object. Processing then ends at 395.

On the other hand, if there is enough space (either without garbage collection whereupon decision 340 branches to "yes" branch 380 or after garbage collection has been performed whereupon decision 360 branches to "yes" branch 375), then the requested resource space is allocated in the heap (step 390). Processing then ends at 395.

Figure 4:
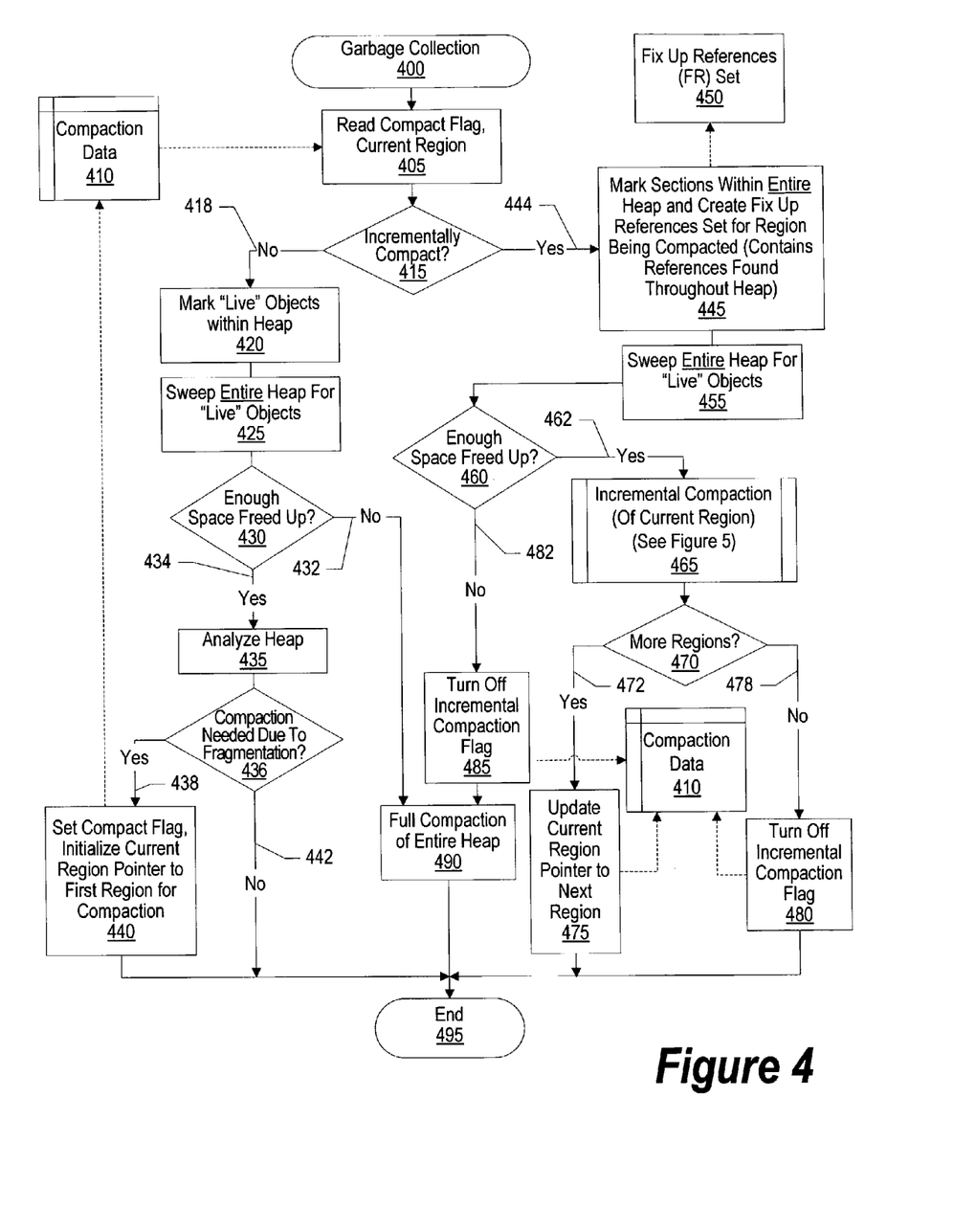
FIG. 4 is a flowchart showing a garbage collection process.

FIG. 4 is a flowchart showing a garbage collection process. Processing commences at 400 whereupon an incremental compaction flag and current region pointer are read (step 405) from compaction data memory area 410. The incremental compaction flag indicates whether the system is currently in an incremental compaction cycle and the current region pointer indicates the next region within the heap to be compacted.

A determination is made as to whether the incremental compaction flag is set indicating that an incremental compaction cycle is underway (decision 415). If an incremental compaction cycle is not underway, decision 415 branches to "no" branch 418 whereupon the "live" objects within the entire heap are identified (step 420) and the entire heap is swept in order to logically remove "dead" objects from the heap (step 425). A determination is made as to whether enough space was freed up during the sweep to satisfy the request that triggered the garbage collection event (decision 430). If enough space was not freed up, decision 430 branches to "no" branch 432 whereupon the entire heap is compacted (step 490) and processing ends at 495.

On the other hand, if enough space was freed up, decision 430 branches to "yes" branch 434 whereupon the heap is analyzed to determine whether it would be advantageous to commence an incremental compaction sequence (step 435). A determination is made as to whether incremental compaction is needed in light of the amount of heap fragmentation (decision 436). If compaction is needed, decision 436 branches to "yes" branch 438 whereupon the incremental compaction flag is set (i.e., turned on) and the current region pointer is set to point to the first region within the heap to be compacted (step 440) and processing ends at 495. On the other hand, if compaction is not needed, decision 436 branches to "no" branch 442 whereupon processing ends at 495.

Returning to decision 415, if the incremental compaction flag has been turned on, decision 415 branches to "yes" branch 444 whereupon the "live" objects within the entire heap are identified and any references to objects within the region to be compacted are retained (step 445) in fix up references set 450. In this manner, if an object within the compacted region is being referenced by an object outside the region, the reference is retained so that it can updated to reflect the new location of the moved object within the compacted region. The entire heap is then swept in order to logically remove "dead" objects from the heap (step 455). A determination is made as to whether enough space was freed up during the sweep to satisfy the request that triggered the garbage collection event (decision 460). If enough space was not freed up, decision 460 branches to "no" branch 482 whereupon the incremental compaction flag is turned off (step 485) and the entire heap is compacted (step 490). Processing thereafter ends at 495.

Figure 5:
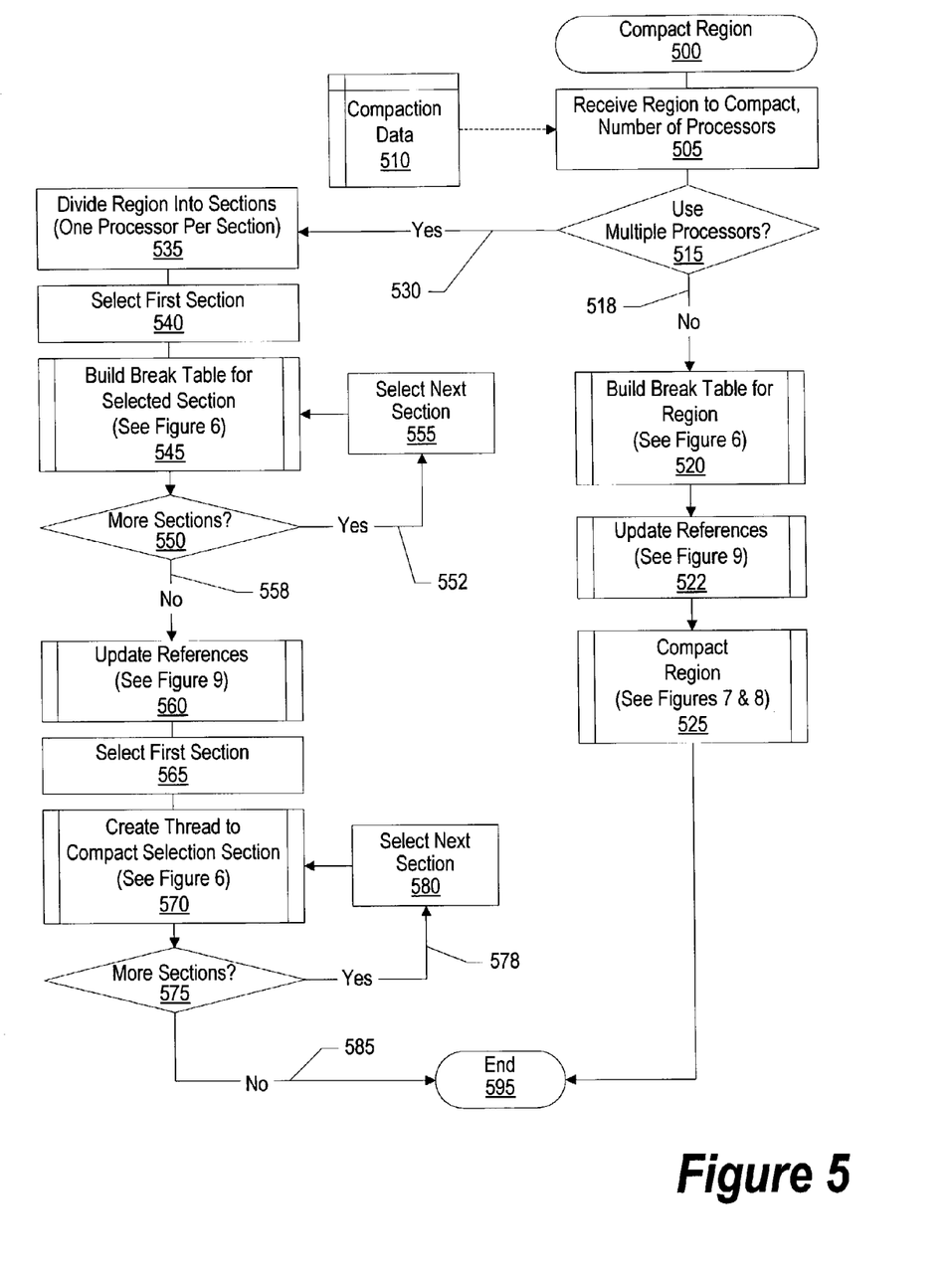
FIG. 5 is a higher level flowchart showing compaction steps used with a garbage-collected heap.

On the other hand, if enough space was freed up during the sweep, decision 460 branches to "yes" branch 462 whereupon the current region is compacted (predefined process, see FIG. 5 for processing details). After the region is compacted, a determination is made as to whether there are more regions within the heap that need to be compacted during this incremental compaction cycle (decision 470). If there are more regions to be compacted during this incremental compaction cycle, decision 470 branches to "yes" branch 472 whereupon the current region pointer in compaction data 410 is updated to point to the next region to be compacted (step 475). On the other hand, if there are no more regions of the heap to be compacted, decision 470 branches to "no" branch 478 whereupon the incremental compaction flag is turned off (step 480). Processing thereafter ends at 495.

FIG. 5 is a higher level flowchart showing compaction steps used with a garbage-collected heap. As described below, the regions are compacted without "evacuating" (i.e., removing) the objects during the compaction process. Processing commences at 500 whereupon a pointer to the region being compacted is received along with the number of processors that will be used to perform the compaction (step 505) from compaction data memory area 510.

A determination is made as to whether a single processor will be used for the compaction or whether the compaction task will be spread amongst several processors (decision 515). If a single processor is being used, decision 515 branches to "no" branch 518 whereupon a break table is built for the region being compacted (predefined process 520, see FIG. 6 for processing details, also see FIG. 8 block 820 for a description of data included in the break table). After the break table has been created, the amount that each object in the region will be moved during compaction is known. The objects throughout the heap that reference the objects that are about to be moved have their addresses altered so that the references point to the soon-to-be new addresses of the objects in the region. The references in the references set (indicating which references address objects within the region) are updated using the break table which indicates how far the objects in the region will be moved (predefined process 522, see FIG. 9 for processing details). The region is compacted using the single processor (predefined process 525, see FIGS. 7 and 8 for processing details). After the region is compacted, processing ends at 595.

Returning to decision 515, if multiple processors are being used to compact the region, decision 515 branches to "yes" branch 530 whereupon the region is divided into a number of sections (step 535) equal to the number of processors that will be used to compact the region. For example, if there are four processors being used to compact the region, then the region is divided into four sections.

The first section is selected (step 540). A break table is built for the selected section (predefined process 545, see FIG. 6 for processing details, also see FIG. 8 block 820 for a description of data included in the break table). A determination is made as to whether there are more sections for which break tables are needed (decision 550). If there are more sections, decision 550 branches to "yes" branch 552 whereupon the next section is selected (step 555) and processing loops back to build the break table for the next selected section. This looping continues until there are no more sections to process, at which point decision 550 branches to "no" branch 558.

Figure 9:
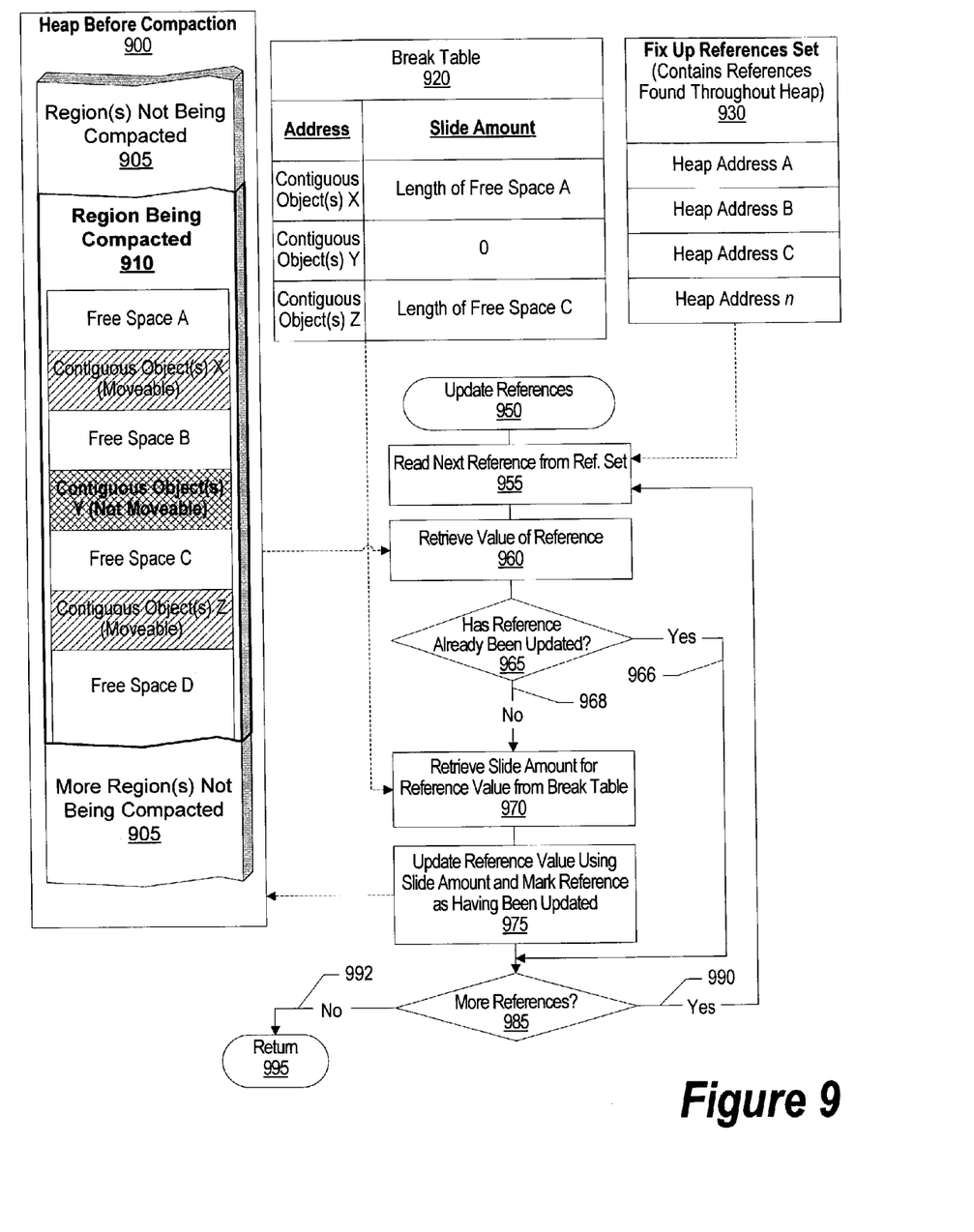
FIG. 9 is a flowchart showing steps taken modifying addresses found in the heap with new addresses that result following compaction of the garbage-collected heap.

The references in the fix up references set (indicating which references address objects within the region) and the break tables which indicates how far the objects in the various sections will be moved (predefined process 560, see FIG. 9 for processing details). Execution threads are then created for each section. The first section in the region is selected (step 565) and a thread of execution is created to compact the first section (predefined process 570, see FIG. 6 for processing details). A determination is made as to whether there are more sections for which threads are needed for compaction (decision 575). If there are more sections, decision 575 branches to "yes" branch whereupon the next selection is selected (step 580) and processing loops back to create a thread to compact this section. This looping continues until there are no more sections to process, at which point decision 575 branches to "no" branch 585. In a multitasking, multiprocessor environment, each of the threads that are created execute concurrently with one another and, in a preferred environment, each thread is executed by a different processor. Processing thereafter ends at 595.

Figure 6:
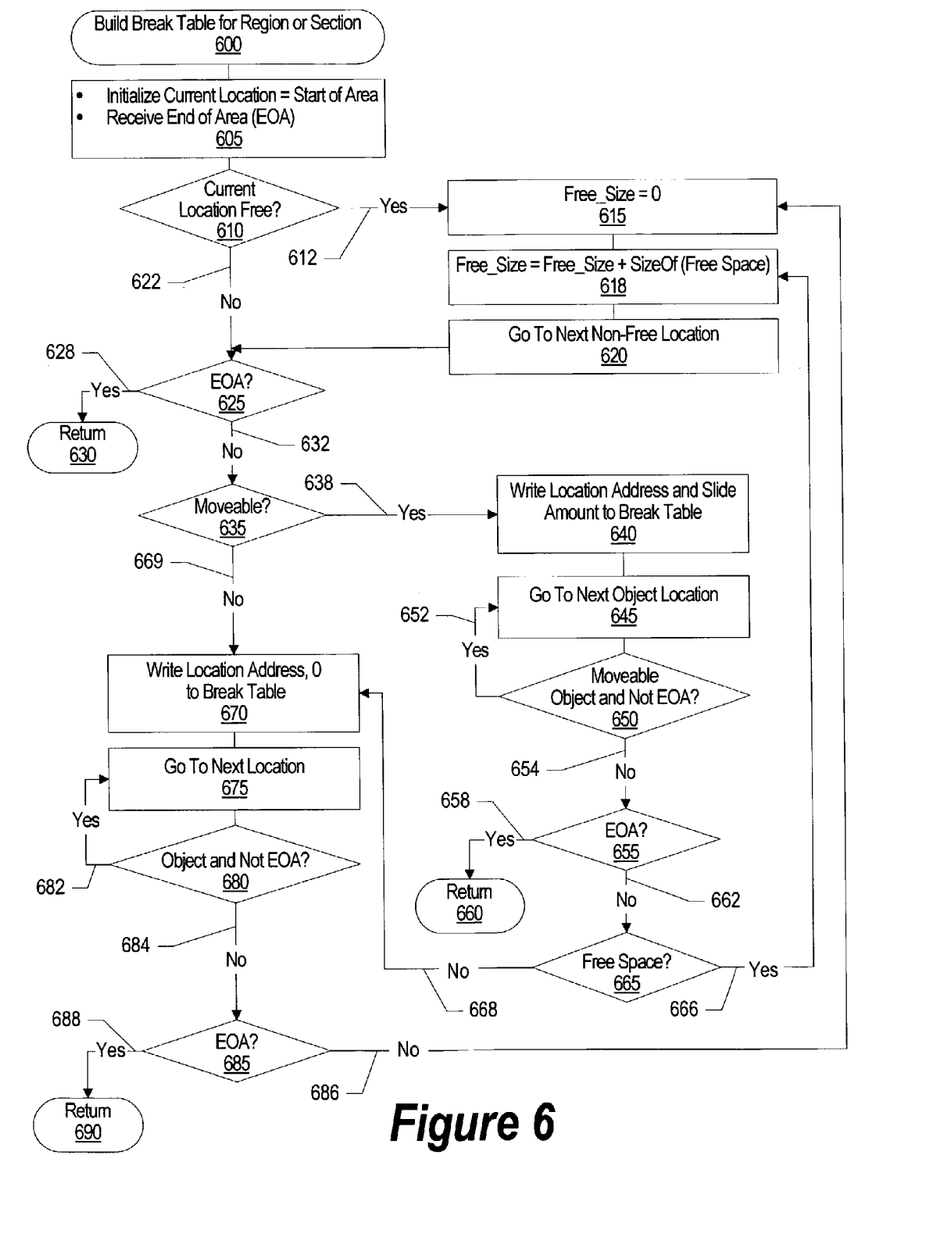
FIG. 6 is a flowchart showing steps taken in building a break table which determines where objects should move and stores the future object address information.

FIG. 6 is a flowchart showing steps taken in building a break table which determines where objects should move and stores the future object address information. Processing commences at 600 whereupon variables are set (step 605) initializing the current location to be at the starting address of the area (i.e., starting address of the region or section), and the end of area ("EOA," i.e., the ending address of the region or section) is received. The break table will be built for those objects within the area as determined by the starting address of the area and the end of area (EOA) address.

A determination is made as to whether the current location is free space (decision 610, i.e., space not being occupied by an object). If the current location is a free space, decision 610 branches to "yes" branch 612 whereupon the size of the free space is initialized to zero (step 615) and then the size of the free space is incremented by the size of the current contiguous free space (step 618). The next non-free space location that follows the contiguous free space is identified (step 620). Returning to decision 610, if the current location is not a free space, decision 610 branches to "no" branch 622 bypassing steps 615 through 620.

A determination is made as to whether the pointer is pointing outside the area being compacted (decision 625). When the pointer points outside the area it indicates that compaction of the region or section is complete. If the pointer points outside the area, decision 625 branches to "yes" branch 628 whereupon processing returns at 630. On the other hand, if the pointer is inside the area being compacted, decision 625 branches to "no" branch 632 whereupon a determination is made as to whether the object to which the pointer now points is moveable (decision 635).

Some objects are marked as "non-moveable" in some embodiments. For example, in a Java heap implementation, using a conservative garbage collector, the objects pointed at by the root set of references are non-moveable. In this case, the system would mark the referenced object as "non-moveable" to prevent the root set of references from being over-written. There are other scenarios, in addition to the example described above, that are appreciated by those skilled in the art that exemplify instances when objects in a heap should not be moved due to the creation of possible post-movement referencing problems.

If the object is not moveable, decision 635 branches to "no" branch 669 which processes the non-moveable block of objects (see description below for details regarding steps 670 through 690). On the other hand, if the object is moveable, decision 635 branches to "yes" branch 638 whereupon the object's starting location and slide, or shift, amount are written to the break table (step 640). The slide, or shift, amount is determined by subtracting the amount of free space that precedes the object from the object's starting location. The pointer is then moved to the next object or free space (step 645). A determination is made as to whether the next object is also a moveable object and also whether the pointer is not at or beyond the end of the area (EOA) being compacted (decision 650). If the next object is also a moveable object and not outside the area being compacted, decision 650 branches to "yes" branch 652 which loops back to select the next location (step 645) and determine whether that location is also a moveable object not outside the area being compacted. This looping continues until all of the contiguous, moveable objects that follow the first moveable object have been identified. In this manner, only one break table entry is written for a contiguous group of moveable objects so that the group can be moved as a larger block of objects, rather than keeping track and separately moving each individual object. At some point, either a non-moveable object, free space, or the end of the area (EOA) is encountered, at which point decision 650 branches to "no" branch 654.

A determination is made as to whether the pointer is now pointing outside the area being compacted (decision 655), indicating that the end of the region or section being compacted is complete. If the pointer points outside the area, decision 655 branches to "yes" branch 658 whereupon processing returns at 660. On the other hand, if the pointer is still inside the area being compacted, decision 655 branches to "no" branch 662 whereupon a determination is made as to whether the object to which the pointer now points is free space or whether the pointer now points to a non-moveable object (decision 665).

If the pointer now points to free space, decision 665 branches to "yes" branch 666 which loops back to increment the amount of free space by incrementing the amount of free space by the size of the newly found block of free space (step 618, see description above for details regarding processing that occurs after step 618). On the other hand, if the pointer now points to a non-moveable object, decision 665 branches to "no" branch 668 whereupon the non-moveable object's location and its non-moveable slide, or shift, amount (i.e., zero) are written to the break table (step 670). Having zero as a slide, or shift, amount will prevent the non-moveable object from being moved when the break table is processed.

The pointer is then moved to the next object or free space following the non-moveable object (step 675). A determination is made as to whether the next location is also an object (i.e., not free space) and also whether the pointer is not at or beyond the end of the area (EOA) being compacted (decision 680). If the next location is an object (moveable or non-moveable) and not outside the area being compacted, decision 680 branches to "yes" branch 682 which loops back to select the next location (step 675) and determine whether that object is also an object not outside the area being compacted. This looping continues until all of the contiguous objects that follow the first non-moveable object have been identified. In this manner, only one break table entry is written for a contiguous group of objects. At some point, either a free space or the end of the area (EOA) is encountered, at which point decision 680 branches to "no" branch 684.

A determination is made as to whether the pointer is now pointing outside the area being compacted (decision 685), indicating that the end of the region or section being compacted has been reached. If the pointer points outside the area, decision 685 branches to "yes" branch 688 whereupon processing returns at 690.

On the other hand, if the pointer now points to a free space that is inside the area being compacted, decision 685 branches to "no" branch 686. Processing loops back to reset the free size to zero (step 615, this is done because objects following the non-moveable block of object(s) do not move in front of the non-moveable block). The amount of free space is incremented by the size of the newly found block of free space (step 618, see description above for details regarding processing that occurs after step 618).

Processing continues to identify the moveable and non-moveable blocks of objects and write corresponding break table entries to the break table until the pointer reaches the end of the area (i.e., section or region) being compacted. When the end of the area is reached, one of the decisions (decision 625, 655, or 685) branches to its "yes" branch and processing returns to the calling routine (see FIG. 5 for steps that occur after processing returns).

Figure 7:
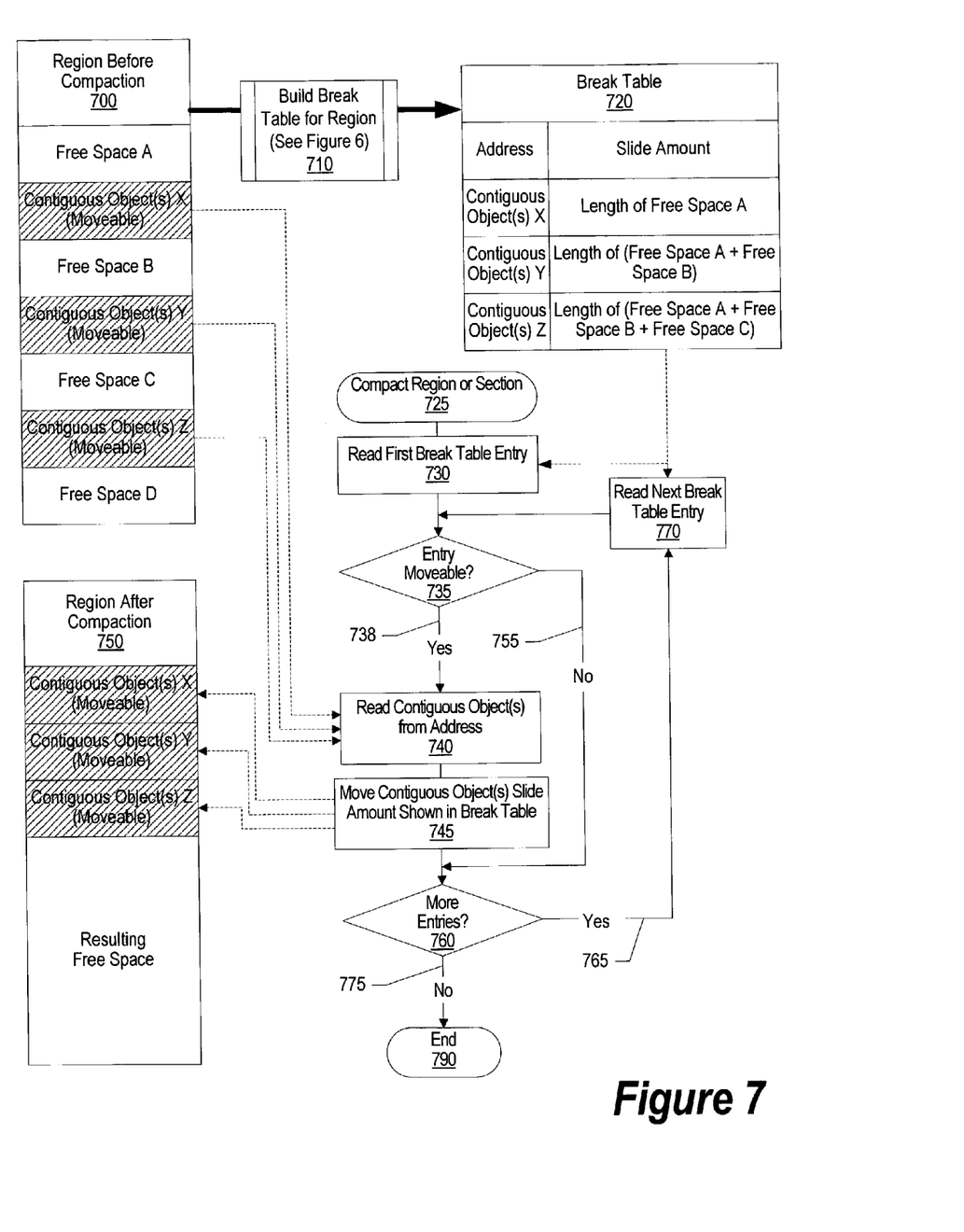
FIG. 7 is a flowchart showing steps taken in compacting a heap using a break table.

FIG. 7 is a flowchart showing steps taken in compacting a heap using a break table. Before compaction, the region being compacted (region 700) appears as groups of contiguous objects with free spaces interspersed in between the contiguous groups. In the example shown, there are three contiguous groups of objects (contiguous objects X, Y, and Z) and four free spaces in between the objects (free spaces A, B, C, and D). Break table 720 is built to identify the locations of the contiguous groups of objects and how far each of the groups of objects should be shifted in order to compact the objects into a larger contiguous group and eliminate free spaces in between the objects (predefined process 710 builds the break table, see FIG. 6 for processing details). As shown in break table 720, the contiguous object (s) "X" can be moved, or slid, the length of free space "A" in order to eliminate free space "A." Contiguous object(s) "Y" can be moved, or slid, the combined length of free spaces "A" and "B" in order to eliminate free space "B." Likewise, contiguous object(s) "Z" can be moved, or slid, the combined length of free spaces "A," "B," and "C" in order to eliminate free space "C." The resulting region after compaction (region 750) shows the contiguous objects moved to one large contiguous object at the beginning of the region with a larger free space following the objects (the larger free space is the same size as, and results from, the sum of free spaces "A," "B," "C," and "D").

Compaction processing commences at 725 whereupon the first break table entry is read (step 730) from break table 720. A determination is made as to whether the entry is moveable (decision 735, i.e., whether the "slide amount" is a non-zero number). If the entry is moveable, decision 735 branches to "yes" branch 738 whereupon the contiguous group of object (s) are read from the region of the heap (step 740) and rewritten back to the heap in their adjusted location (step 745). On the other hand, if the entry is not moveable, decision 735 branches to "no" branch 755 which bypasses the reading and rewriting steps.

A determination is made as to whether there are more entries to process from the break table (decision 760). If there are more entries to process, decision 760 branches to "yes" branch 765 whereupon the next entry is read from the break table (step 770) and processing loops back to process the newly read entry. This looping continues until all the entries in the break table have been processed, at which time decision 760 branches to "no" branch 775 and processing ends at 790.

Figure 8:
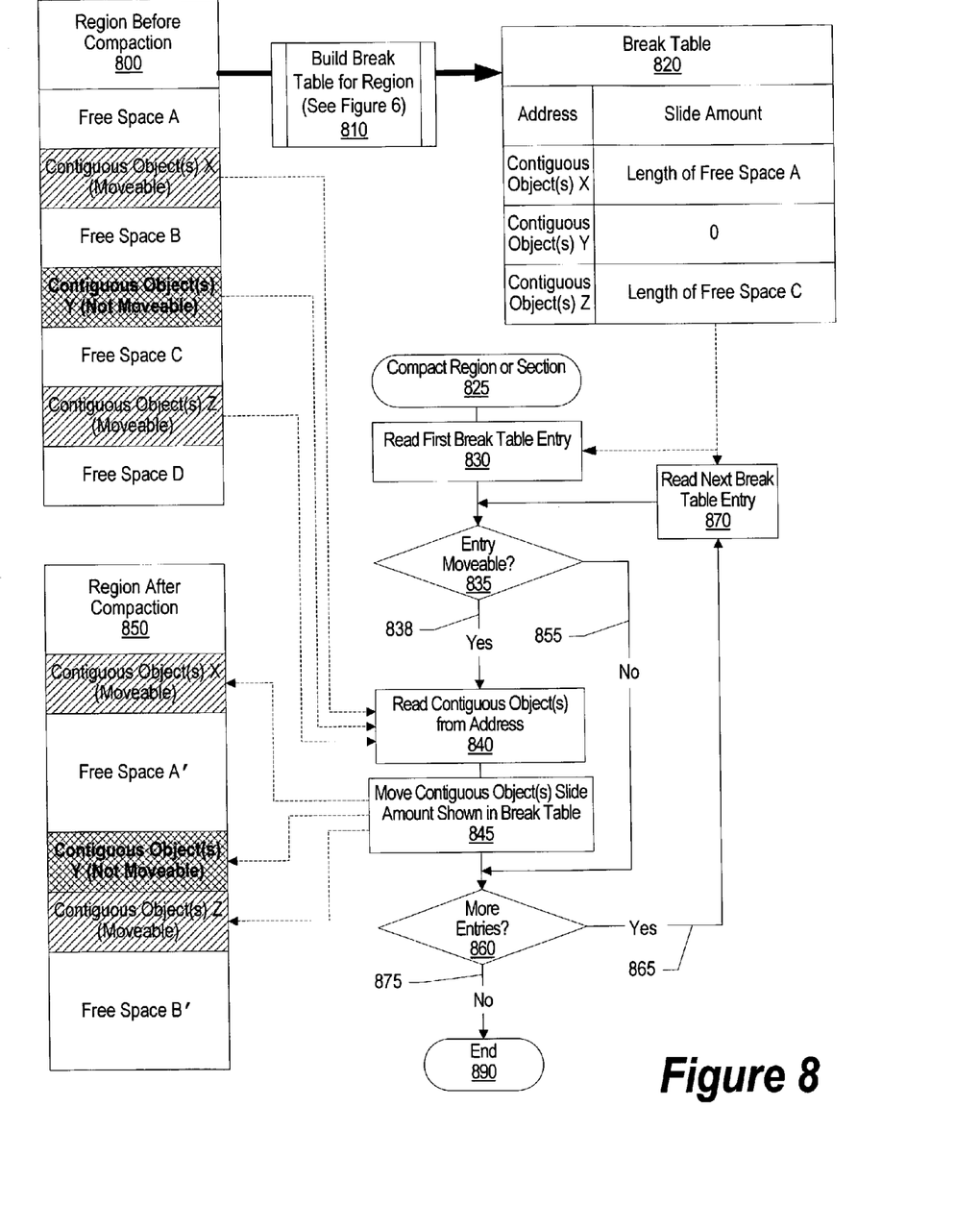
FIG. 8 is a flowchart showing steps taken in compacting a heap using a break table when some objects within the heap are not moveable.

FIG. 8 is a flowchart showing steps taken in compacting a heap using a break table when some objects within the heap are not moveable. FIG. 8 is substantially similar to FIG. 7, except that in FIG. 8 one of the contiguous groups of objects (group "Y") is not moveable. Break table 820 shown in FIG. 8 indicates that contiguous object(s) "Y" has a slide, or shift, amount of zero. While region before compaction 800 is the same as the region before compaction shown in FIG. 7, the region after compaction (region 850) is somewhat different.

In FIG. 8, contiguous group of object(s) "X" is moved to eliminate free space "A." However contiguous group of object(s) "Y" is not moveable, and therefore remains in the same position. As a result, the free space (A') between contiguous groups of objects X and Y is increased to equal the size of free spaces A and B before compaction. Contiguous group of object(s) "Z" is moveable. However, this group is moved up to begin after group "Y" so that objects in group Z are not copied over objects in group Y. This results in the elimination of free space C. A larger free space (B') is thereby created at the end of the region (B' is equal in size to the sum of free spaces C and D).

FIG. 9 is a flowchart showing steps taken modifying addresses found in the heap with new addresses that result following compaction of the garbage-collected heap. FIG. 9 includes heap 900, break table 920, fix up references set 930, and flowchart 950 that details how references are revised to reflect object addresses that are moved during compaction. Heap 900 includes regions that are currently not being compacted (905) during the incremental compaction cycle as well as the region that is currently being compacted (910). Break table 920 indicates the slide, or shift, amount of objects in the region (910) that is being compacted. Fix up references set 930, includes addresses found in heap 900 that reference objects in the region that is being compacted.

Update references processing commences at 950 whereupon the next (or in this case the first) entry from fix up references set 930 is read (step 955). The value of the reference is retrieved by reading the heap address indicated in the references set from the heap (step 960). A determination is made as to whether the reference has already been updated (decision 965). If the reference has already been updated, decision 965 branches to "yes" branch 966 bypassing the steps used to update the reference.

On the other hand, if the reference has not yet been updated, decision 965 branches to "no" branch 968 whereupon the slide amount is retrieved from break table 920 (step 970). The retrieval step identifies which of the contiguous groups of objects matches the reference. This matching is performed by comparing the reference to the break table addresses. If the reference address is less than the starting address for the second contiguous group of object(s) "Y" then the reference is addressing an object in the first group of object(s) (i.e., "X") and the slide amount corresponding to the identified group of objects is retrieved. If the reference address is less than the starting address for the third contiguous group of objects, then the slide amount corresponding to the second group of objects is used. Finally, if the address is not less than any of the starting addresses, then the slide amount for the last group of objects ("Z") is used. The retrieved slide amount is used to update the reference that was found in the heap (step 975). The reference is then marked as already having been updated (step 980) and a corresponding update flag is set in the fix up references set.

A determination is made as to whether there are more references in the fix up references set that need to be updated (decision 985). If there are more references, decision 985 loops back to select and process the next reference. This looping continues until there are no more references to update, at which point decision 985 branches to "no" branch 992 and processing returns to the calling routine at 995 (see FIG. 5 for details regarding subsequent processing steps).

Figure 10:
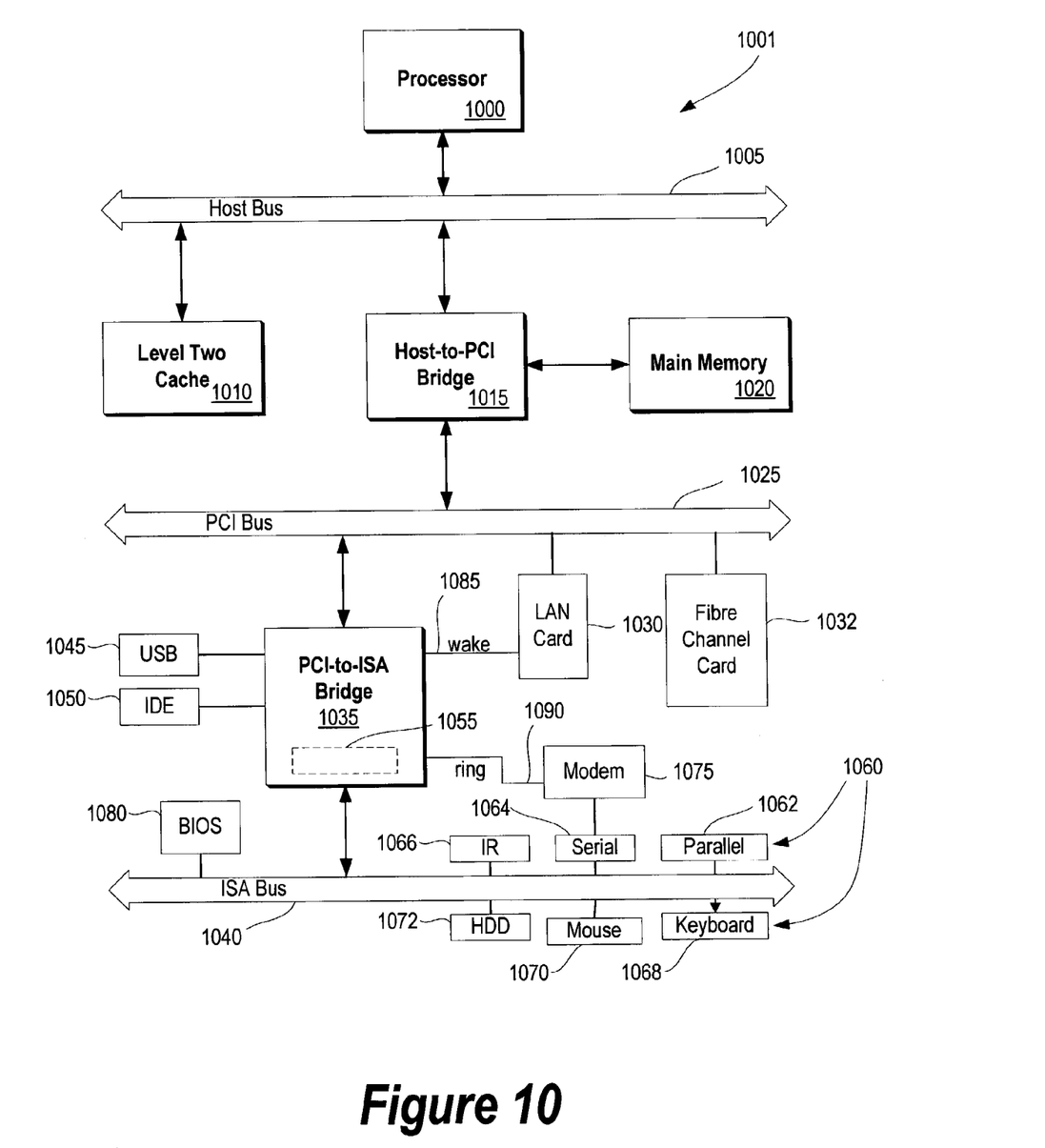
FIG. 10 is a block diagram of an information handling system capable of implementing the present invention.

FIG. 10 illustrates information handling system 1001 which is a simplified example of a computer system capable of performing the operations described herein. Computer system 1001 includes processor 1000 which is coupled to host bus 1005. A level two (L2) cache memory 1010 is also coupled to the host bus 1005. Host-to-PCI bridge 1015 is coupled to main memory 1020, includes cache memory and main memory control functions, and provides bus control to handle transfers among PCI bus 1025, processor 1000, L2 cache 1010, main memory 1020, and host bus 1005. PCI bus 1025 provides an interface for a variety of devices including, for example, LAN card 1030. PCI-to-ISA bridge 1035 provides bus control to handle transfers between PCI bus 1025 and ISA bus 1040, universal serial bus (USB) functionality 1045, IDE device functionality 1050, power management functionality 1055, and can include other functional elements not shown, such as a real-time clock (RTC), DMA control, interrupt support, and system management bus support. Peripheral devices and input/output (I/O) devices can be attached to various interfaces 1060 (e.g., parallel interface 1062, serial interface 1064, infrared (IR) interface 1066, keyboard interface 1068, mouse interface 1070, fixed disk (HDD) 1072 coupled to ISA bus 1040. Alternatively, many I/O devices can be accommodated by a super I/O controller (not shown) attached to ISA bus 1040.

BIOS 1080 is coupled to ISA bus 1040, and incorporates the necessary processor executable code for a variety of low-level system functions and system boot functions. BIOS 1080 can be stored in any computer readable medium, including magnetic storage media, optical storage media, flash memory, random access memory, read only memory, and communications media conveying signals encoding the instructions (e.g., signals from a network). In order to attach computer system 1001 to another computer system to copy files over a network, LAN card 1030 is coupled to PCI bus 1025 and to PCI-to-ISA bridge 1035. Similarly, to connect computer system 1001 to an ISP to connect to the Internet using a telephone line connection, modem 1075 is connected to serial port 1064 and PCI-to-ISA Bridge 1035.

While the computer system described in FIG. 10 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of incrementally compacting a computer system heap, said method comprising:
   dividing the heap into a plurality of logical regions; and
   compacting each logical region at a different time without evacuating the logical region being compacted, wherein the compacting of each logical region utilizes a break table and a fix up references set.

2. The method as described in claim 1 wherein each logical region is compacted during a separate garbage collection event.

3. The method as described in claim 1 further comprising:
   identifying free spaces within the logical region being compacted;
   determining new object locations within the logical region for one or more of the objects within the logical region being compacted, the new object locations based upon the identified free spaces; and
   storing the new object locations in the break table prior to the compacting.

4. The method as described in claim 1 further comprising:
dividing the logical region being compacted into a plurality of logical sections, wherein the break table includes a plurality of break tables corresponding to the plurality of logical sections;
identifying free spaces within the logical sections;
determining new object locations within the logical section, the new object locations based upon the identified free spaces; and
storing the new object locations in the break table corresponding to the logical section.

5. The method as described in claim 4 further comprising:
creating a thread for each of the logical sections; and
executing each of the plurality of threads on a different processor selected from a plurality of processor.

6. The method as described in claim 5 wherein the execution of the threads further comprises:
moving the objects within the corresponding section to a new location as identified by the corresponding break table independently of synchronization amongst the processors.

7. The method as described in claim 1 further comprising:
identifying one or more references throughout the heap that address one or more objects included in the logical region being compacted;
storing the references and the object addresses in the fix up references set prior to the compacting; and
adjusting the references to address altered locations of the objects moved during the compacting.

8. The method as described in claim 1 wherein the logical region includes one or more non-moveable objects, the method further comprising:
identifying the non-moveable objects, free spaces, and moveable objects within the logical region being compacted;
determining new object locations within the logical region for the moveable objects within the logical region being compacted, the new object locations based upon the identified free spaces and the locations of the identified non-moveable objects; and
storing the new object locations in the break table prior to the compacting.

9. The method as described in claim 1 further comprising:
executing one or more software applications in between the compaction of the different logical regions, wherein the computer system heap is available to the software applications during their execution.

10. An information handling system comprising:
one or more processors;
a memory accessible by the processors;
a middleware application that runs on the operating system, the middleware application including a garbage-collected heap; and
an compaction tool for incrementally compacting the garbage-collected heap, the compaction tool including:
means for dividing the heap into a plurality of logical regions; and
means for compacting each logical region at a different time without evacuating objects from the logical region being compacted, wherein the compacting of each logical region utilizes a break table and a fix up references set.

11. The information handling system as described in claim 10 wherein each logical region is compacted during a separate garbage collection event.

12. The information handling system as described in claim 10 further comprising:
means for identifying free spaces within the logical region being compacted;
means for determining new object locations within the logical region for one or more of the objects within the logical region being compacted, the new object locations based upon the identified free spaces; and
means for storing the new object locations in the break table prior to the compacting.

13. The information handling system as described in claim 10 further comprising:
means for dividing the logical region being compacted into a plurality of logical sections, wherein the break table includes a plurality of break tables corresponding to the plurality of logical sections;
means for identifying free spaces within the logical sections;
means for determining new object locations within the logical section, the new object locations based upon the identified free spaces; and
means for storing the new object locations in the break table corresponding to the logical section.

14. The information handling system as described in claim 13 further comprising:
means for creating a thread for each of the logical sections; and
means for executing each of the plurality of threads on a different processor selected from a plurality of processors.

15. The information handling system as described in claim 14 wherein the means for executing the threads further comprises:
means f or moving the objects within the corresponding section to a new location as identified by the corresponding break table independently of synchronization amongst the processors.

16. The information handling system as described in claim 10 further comprising:
means for identifying one or more references throughout the heap that address one or more objects included in the logical region being compacted;
means for storing the references and the object addresses in the fix up references set prior to the compacting; and
means for adjusting the references to address altered locations of the objects moved during the compacting.

17. The information handling system as described in claim 10 wherein the logical region includes one or more non-moveable objects, the information handling system further comprising:
means for identifying the non-moveable objects, free spaces, and moveable objects within the logical region being compacted;
means for determining new object location within the logical region for the moveable objects within the logical region being compacted, the new object locations based upon the identified free spaces and the locations of the identified non-moveable objects; and
means for storing the new object locations in the break table prior to the compacting.

18. The information handling system as described in claim 10 further comprising:
means for executing one or more software applications in between the compaction of the different logical regions, wherein the computer system heap is available to the software applications during their execution.

19. A computer program product stored on a computer operable media for incrementally compacting a computer system heap, said computer program product comprising:
  means for dividing the heap into a plurality of logical regions; and
  means for compacting each logical region at a different time without evacuating objects from the logical region being compacted, wherein the compacting of each logical region utilizes a break table and a fix up references set.

20. The computer program product as described in claim 19 wherein each logical region is compacted during a separate garbage collection event.

21. The computer program product as described in claim 19 further comprising:
  means for identifying free spaces within the logical region being compacted;
  means for determining new object locations within the logical region for one or more of the objects within the logical region being compacted, the new object locations based upon the identified free spaces; and
  means for storing the new object locations in the break table prior to the compacting.

22. The computer program product as described in claim 19 further comprising:
  means for dividing the logical region being compacted into a plurality of logical sections, wherein the break table includes a plurality of break tables corresponding to the plurality of logical sections;
  means for identifying free spaces within the logical sections;
  means for determining new object locations within the logical section, the new object locations based upon the identified free spaces; and
  means for storing the new object locations in the break table corresponding to the logical section.

23. The computer program product as described in claim 22 further comprising:
  means for creating a thread for each of the logical sections; and
  means for executing each of the plurality of threads on a different processor selected from a plurality of processors.

24. The computer program product as described in claim 23 wherein the means for executing the threads further comprises:
  means for moving the objects within the corresponding section to a new location as identified by the corresponding break table independently of synchronization amongst the processors.

25. The computer program product as described in claim 19 further comprising:
  means for identifying one or more references throughout the heap that address one or more objects included in the logical region being compacted;
  means for storing the references and the object addresses in the fix up references set prior to the compacting; and
  means for adjusting the references to address altered locations of the objects moved during the compacting.

26. The computer program product as described in claim 19 wherein the logical region includes one or more non-moveable objects, the computer program product further comprising:
  means for identifying the non-moveable objects, free spaces, and moveable objects within the logical region being compacted;
  means for determining new object locations within the logical region for the moveable objects within the logical region being compacted, the new object locations based upon the identified free spaces and the locations of the identified non-moveable objects; and
  means for storing the new object locations in the break table prior to the compacting.

27. The computer program product as described in claim 19 further comprising:
  means for executing one or more software applications in between the compaction of the different logical regions, wherein the computer system heap is available to the software applications during their execution.

* * * * *